US011035607B2

(12) United States Patent
Naik et al.

(10) Patent No.: US 11,035,607 B2
(45) Date of Patent: Jun. 15, 2021

(54) USE OF MULTIPLE PORT LOCATIONS FOR ACHIEVING FASTER VACUUM EVACUATION TIME IN VACUUM INSULATED STRUCTURES

(71) Applicant: WHIRLPOOL CORPORATION, Benton Harbor, MI (US)

(72) Inventors: Abhay Naik, Stevensville, MI (US); Subrata Shannigrahi, Saint Joseph, MI (US); Gustavo Frattini, Benton Harbor, MI (US)

(73) Assignee: Whirlpool Corporation, Benton Harbor, MI (US)

(*) Notice: Subject to any disclaimer, the term of this patent is extended or adjusted under 35 U.S.C. 154(b) by 0 days.

(21) Appl. No.: 16/302,939

(22) PCT Filed: Jan. 18, 2017

(86) PCT No.: PCT/US2017/013949
§ 371 (c)(1),
(2) Date: Nov. 19, 2018

(87) PCT Pub. No.: WO2018/136055
PCT Pub. Date: Jul. 26, 2018

(65) Prior Publication Data
US 2019/0145697 A1    May 16, 2019

(51) Int. Cl.
*F25D 23/06* (2006.01)
*F16L 59/065* (2006.01)

(52) U.S. Cl.
CPC ......... *F25D 23/062* (2013.01); *F16L 59/065* (2013.01); *F25D 23/06* (2013.01); *F25D 2201/14* (2013.01); *Y02B 40/00* (2013.01)

(58) Field of Classification Search
CPC .... F25D 23/062; F25D 23/06; F25D 2201/14; F16L 59/065; Y02B 40/34
(Continued)

(56) References Cited

U.S. PATENT DOCUMENTS

| 1,022,065 A | 4/1912 | Dean |
| 2,128,336 A * | 8/1938 | Torstensson ............ E04B 1/76 |
| | | 220/DIG. 9 |

(Continued)

FOREIGN PATENT DOCUMENTS

| EP | 0587548 | 3/1994 |
| EP | 0757136 | 2/1997 |

(Continued)

*Primary Examiner* — Daniel J Troy
*Assistant Examiner* — Timothy M Ayres
(74) *Attorney, Agent, or Firm* — Price Heneveld LLP

(57) ABSTRACT

An appliance includes an outer wrapper having a plurality of joined walls that define a plurality of vertices and edges. An inner liner is sealed with the outer wrapper to define an insulation space. A vacuum port is disposed on an external surface of the outer wrapper. A channel is in fluid communication with the vacuum port and extends along at least one edge defined by first and second walls of the outer wrapper. An insulative material is disposed between the outer wrapper and the inner liner. A filter media is disposed along the channel such that air can be drawn from the insulation space past the filter media, into the channel, and through each vacuum port.

20 Claims, 15 Drawing Sheets

(58) Field of Classification Search
USPC .......................................................... 312/400
See application file for complete search history.

(56) References Cited

U.S. PATENT DOCUMENTS

| | | | | |
|---|---|---|---|---|
| 3,010,262 A * | 11/1961 | Rumsey, Jr. | ............ | B65B 31/06 |
| | | | | 156/163 |
| 3,052,019 A | 9/1962 | Strasser | | |
| 3,358,059 A * | 12/1967 | Snyder | .................. | B29C 44/445 |
| | | | | 141/290 |
| 3,739,936 A | 6/1973 | Jones | | |
| 4,132,755 A * | 1/1979 | Johnson | ................ | B29C 70/443 |
| | | | | 264/102 |
| 5,252,408 A | 10/1993 | Bridges | | |
| 5,500,305 A * | 3/1996 | Bridges | .................. | E04B 1/803 |
| | | | | 428/621 |
| 5,509,248 A | 4/1996 | Dellby et al. | | |
| 5,512,345 A | 4/1996 | Tsutsumi et al. | | |
| 5,586,680 A | 12/1996 | Dellby | | |
| 5,827,385 A * | 10/1998 | Meyer | ..................... | B29C 44/56 |
| | | | | 156/87 |
| 6,090,335 A * | 7/2000 | McClure | ............... | B29C 70/443 |
| | | | | 264/154 |
| 6,109,712 A | 8/2000 | Haworth et al. | | |
| 6,656,411 B1 * | 12/2003 | McClure | ............... | B29C 70/547 |
| | | | | 264/257 |
| 8,298,473 B2 * | 10/2012 | Dull | ........................ | B29C 33/18 |
| | | | | 264/511 |
| 8,678,530 B2 * | 3/2014 | Wilson | ................ | B29C 44/385 |
| | | | | 137/561 A |
| 8,944,541 B2 * | 2/2015 | Allard | ................... | F25D 23/062 |
| | | | | 312/406 |
| 9,132,592 B2 | 9/2015 | Tobbe et al. | | |
| 10,220,605 B2 * | 3/2019 | Stephenson | ............ | B33Y 10/00 |
| 10,605,520 B1 | 3/2020 | Ekshinge et al. | | |
| 2005/0235682 A1 | 10/2005 | Hirai et al. | | |
| 2009/0038244 A1 | 2/2009 | Kuhn et al. | | |
| 2010/0136231 A1 | 6/2010 | Guttinger et al. | | |
| 2012/0104923 A1 | 5/2012 | Jung et al. | | |
| 2013/0257257 A1 * | 10/2013 | Cur | ....................... | F25D 23/065 |
| | | | | 312/406.1 |
| 2014/0346942 A1 | 11/2014 | Kim et al. | | |
| 2017/0159999 A1 * | 6/2017 | Deka | ..................... | F25D 23/062 |
| 2017/0160001 A1 | 6/2017 | Deka et al. | | |
| 2017/0276287 A1 | 9/2017 | Kawarazaki et al. | | |
| 2019/0128592 A1 * | 5/2019 | Westlake | ............... | F25D 23/062 |
| 2019/0145697 A1 | 5/2019 | Naik et al. | | |
| 2019/0293339 A1 | 9/2019 | Gomes et al. | | |
| 2020/0103067 A1 | 4/2020 | Allard et al. | | |

FOREIGN PATENT DOCUMENTS

| | | |
|---|---|---|
| EP | 0857928 A1 | 8/1998 |
| EP | 1335171 A1 | 8/2003 |
| GB | 730146 | 5/1955 |
| JP | 4366093 | 12/1992 |
| JP | H04366094 A | 12/1992 |
| WO | 9829309 A1 | 7/1998 |
| WO | 03081152 A1 | 10/2003 |
| WO | 2005093349 A1 | 10/2005 |

* cited by examiner

USE OF MULTIPLE PORT LOCATIONS FOR ACHIEVING FASTER VACUUM EVACUATION TIME IN VACUUM INSULATED STRUCTURES

CROSS-REFERENCE TO RELATED APPLICATION

This application claims priority to International Application No. PCT/US2017/013949, filed on Jan. 18, 2017, entitled "USE OF MULTIPLE PORT LOCATIONS FOR ACHIEVING FASTER VACUUM EVACUATION TIME IN VACUUM INSULATED STRUCTURES," the disclosure of which is hereby incorporated herein by reference in its entirely.

This application is related to U.S. application Ser. No. 16/303,549, filed Nov. 20, 2018, which claims priority to International Application No. PCT/US2017/013936, filed on Jan. 18, 2017, entitled "INCREASED VACUUM PORT AREA FOR ACHIEVING FASTER VACUUM EVACUATION TIME IN VACUUM INSULATED STRUCTURES," and U.S. application Ser. No. 16/302,923, filed Nov. 19, 2018, which claims priority to International Application No. PCT/US2017/013940, filed on Jan. 18, 2017, entitled "USE OF RIGID OR PERMEABLE CONDUITS FOR ACHIEVING FASTER VACUUM EVACUATION TIME IN VACUUM INSULATED STRUCTURES."

FIELD OF THE DISCLOSURE

The present device generally relates to a vacuum insulated structure, and more specifically, to the use of multiple port locations for achieving faster vacuum evacuation time in vacuum insulated structures.

BACKGROUND OF THE DISCLOSURE

Increasing the insulative qualities of appliances, and particularly refrigerating appliances, is helpful to provide efficient, quality products for consumer use. In addition, manufacturing appliances with speed and efficiency is lowers energy consumption and speed to market. Processes to achieve these qualities are useful.

SUMMARY

In one aspect, an appliance includes an outer wrapper having a plurality of joined walls that define a plurality of vertices and edges. An inner liner is sealed with the outer wrapper to define an insulation space. A vacuum port is disposed on an external surface of the outer wrapper. A channel is in fluid communication with the vacuum port and extends along at least one edge defined by first and second walls of the outer wrapper. An insulative material is disposed between the outer wrapper and the inner liner. A filter media is disposed along the channel such that air can be drawn from the insulation space past the filter media, into the channel, and through each vacuum port.

In another aspect, an appliance includes an outer wrapper having a plurality of joined walls. An inner liner is sealed with the outer wrapper to define an insulation space. A vacuum port is disposed on an external surface of the outer wrapper. A channel is in fluid communication with the vacuum port and extends along a junction formed by first and second walls of the outer wrapper. An insulative material is disposed between the outer wrapper and the inner liner. A filter media is disposed along the channel such that air can be drawn from the insulation space past the filter media, into the channel, and through each vacuum port.

In yet another aspect, an appliance includes an outer wrapper having a plurality of joined walls. An inner liner is sealed with the outer wrapper to define an insulation space. A vacuum port is disposed on an external surface of the outer wrapper. An insulative material is disposed between the outer wrapper and the inner liner. A permeable filter tube is in fluid communication with the vacuum port and extends along a junction formed by first and second walls of the outer wrapper such that air can be drawn from the insulation space past the filter media, into the permeable filter tube, and through each vacuum port.

These and other features, advantages, and objects of the present device will be further understood and appreciated by those skilled in the art upon studying the following specification, claims, and appended drawings.

DETAILED DESCRIPTION OF THE EMBODIMENTS

Figure 1:
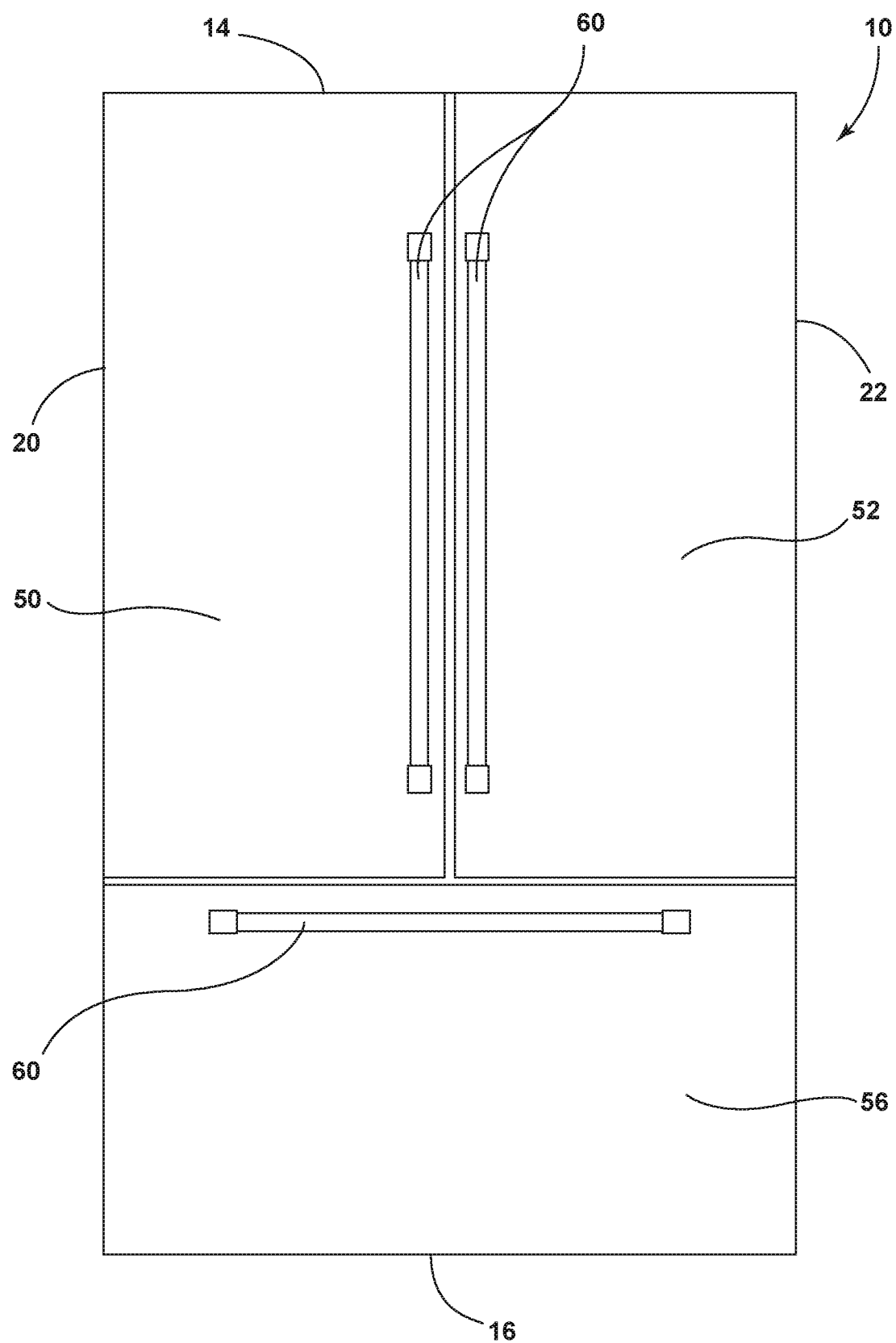
FIG. 1 is a front elevational view of one embodiment of an appliance of the present disclosure.

It is to be understood that the specific devices and processes illustrated in the attached drawings, and described in the following specification are simply exemplary embodiments of the inventive concepts defined in the appended claims. Hence, other physical characteristics relating to the embodiments disclosed herein are not to be considered as limiting, unless the claims expressly state otherwise.

The present illustrated embodiments reside primarily in combinations of method steps and apparatus components related to a vacuum insulated structure. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the device closer to an intended viewer of the device, and the term "rear" shall refer to the surface of the device further from the intended viewer of the device. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring now to FIGS. 1-15, reference numeral 10 generally designates an appliance having an outer wrapper 12 that defines a top wall 14, a bottom wall 16, a rear wall 18, and first and second side walls 20, 22 and includes an inner liner 24. A trim breaker 26 seals the outer wrapper 12 to the inner liner 24 to define an insulation space 30. A single vacuum port 32 is disposed on each of the top wall 14, the bottom wall 16, and the first and second side walls 20, 22. A plurality of vacuum ports 32 is disposed on the rear wall 18. An insulative material 34 is disposed between the outer wrapper 12 and the inner liner 24. A filter media 40 is disposed proximate each vacuum port 32 such that air can be drawn from the insulation space 30 past the filter media 40 and through each vacuum port 32.

Figure 1A:
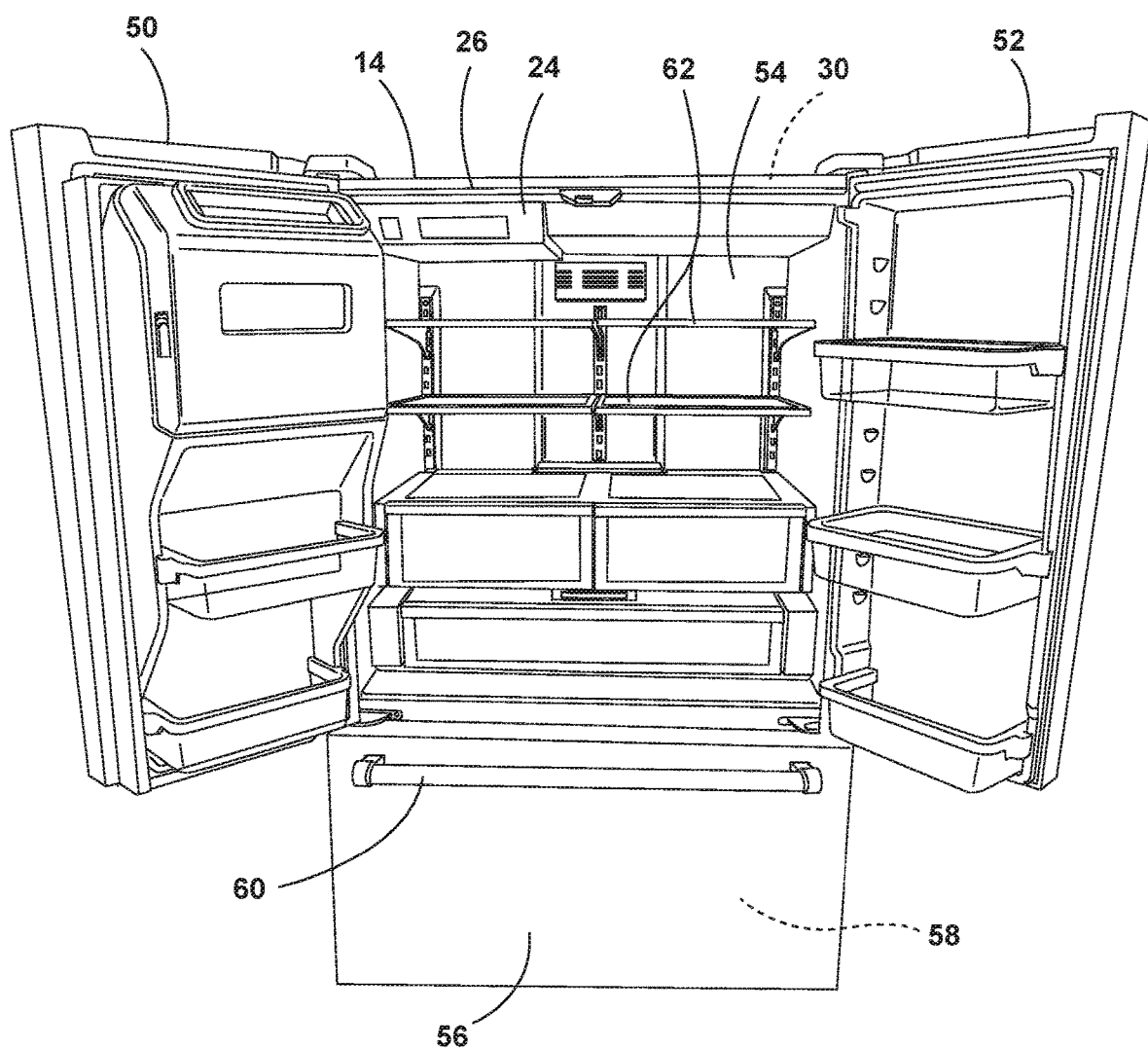
FIG. 1A is a front elevational view of the appliance of FIG. 1 with first and second doors of the appliance in an open position.

With reference again to FIG. 1, the illustrated appliance 10 is a refrigerator assembly that includes French doors 50, 52 that are pivotally coupled with a refrigerator compartment 54 and operable between open and closed positions. The refrigerator assembly also includes a lower pull out drawer 56 that defines a freezer compartment 58. It will generally be understood that the features, as set forth herein, could be applied to any appliance having any general configuration. Further, the door configuration of the appliance 10 can vary from that shown in FIG. 1. The doors 50, 52, as illustrated in FIG. 1, include handles 60 configured to allow a user to move the doors 50, 52 between open and closed positions. The refrigerator compartment 54 and the freezer compartment 58 include shelving 62, as shown in FIG. 1A, that can be adjusted and moved, depending on consumer preference. The outer wrapper 12 of the appliance 10 is generally formed from a metal material, which may be steel, aluminum, etc. The inner liner 24 is also constructed from a metal material, which may be steel, aluminum, etc. However, sealed plastics, or other materials that can maintain an airtight seal, could also be used in conjunction with the systems, as set forth herein.

Figure 2:
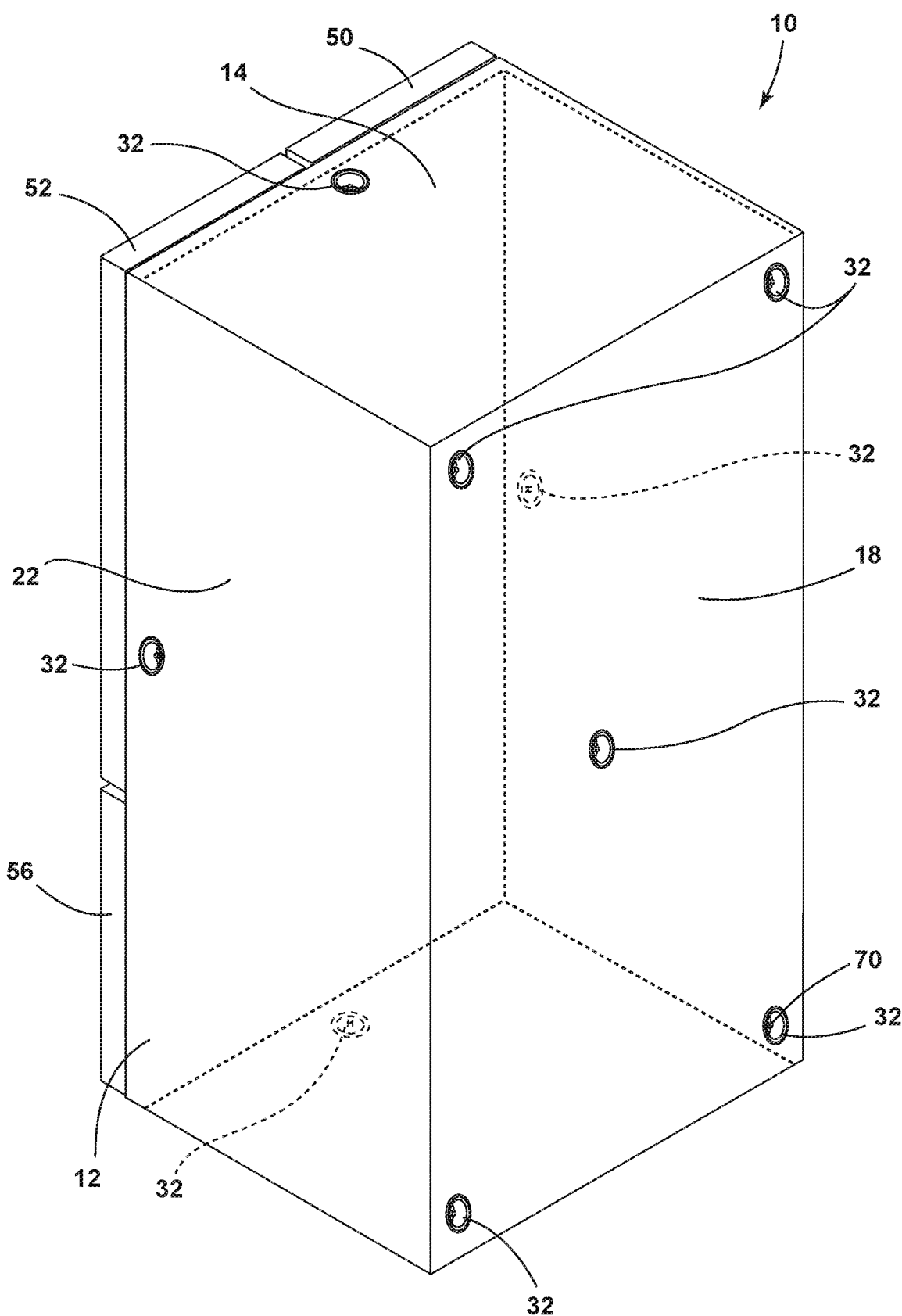
FIG. 2 is a top perspective view of a rear portion of an appliance of the present disclosure.

With reference now to FIG. 2, the illustrated embodiment includes a plurality of vacuum ports 32 that are spaced at predetermined positions to draw a sufficient amount of vacuum from areas of the insulation space 30. As a result of the additional vacuum ports 32, the total vacuum time to place the insulative material 34 in a vacuum state and draw fluid (in the form of air) from the insulation space 30 is lessened. Consequently, refrigerator assemblies can be constructed at a faster rate and with a greater degree of negative pressure between the inner liner 24 and the outer wrapper 12. Each of the ports 32 include a valve system 70 configured to prevent air from entering the insulation space 30 after the vacuum process has been completed. In the illustrated embodiment of FIGS. 2 and 2A, a vacuum port 32 is disposed on each of the top wall 14, the bottom wall 16, the rear wall 18, and the first and second side walls 20, 22. However, it will be noted that more vacuum ports 32 could be disposed on any of the top wall 14, the bottom wall 16, the rear wall 18, and the first and second side walls 20, 22 to increase the speed in which a negative pressure is obtained within the insulation space 30.

In some instances, the vacuum ports 32 may be removed from certain walls of the appliance 10. For example, in the event the appliance 10 will have exposed first and second side walls 20, 22 that are readily viewable by the consumer, the vacuum ports 32 may be omitted from the first and second side walls 20, 22. In this instance, additional vacuum ports 32 may be disposed on first and second sides of the top wall 14 proximate the first and second side walls 20, 22 or on first and second sides of the bottom wall 16 in close proximity to the first and second side walls 20, 22. In addition, more vacuum ports 32 on the rear wall 18 may also be positioned on the outer wrapper 12 to compensate for the loss of a vacuum port 32 of each of the first and second side walls 20, 22. The valves that make up the vacuum ports 32 are configured to attached with a vacuum hose 80 (FIG. 13) and may include ball valves, butterfly valves, check valves, choke valves, diaphragm valves, gate valves, globe valves, poppet valves, etc. A simple crimping solution or an end cap can also be used to close the vacuum hose 80. It will be understood that any kind and any number of valves may be used and that this disclosure is not limited by any of the valve systems noted above.

Figure 2A:
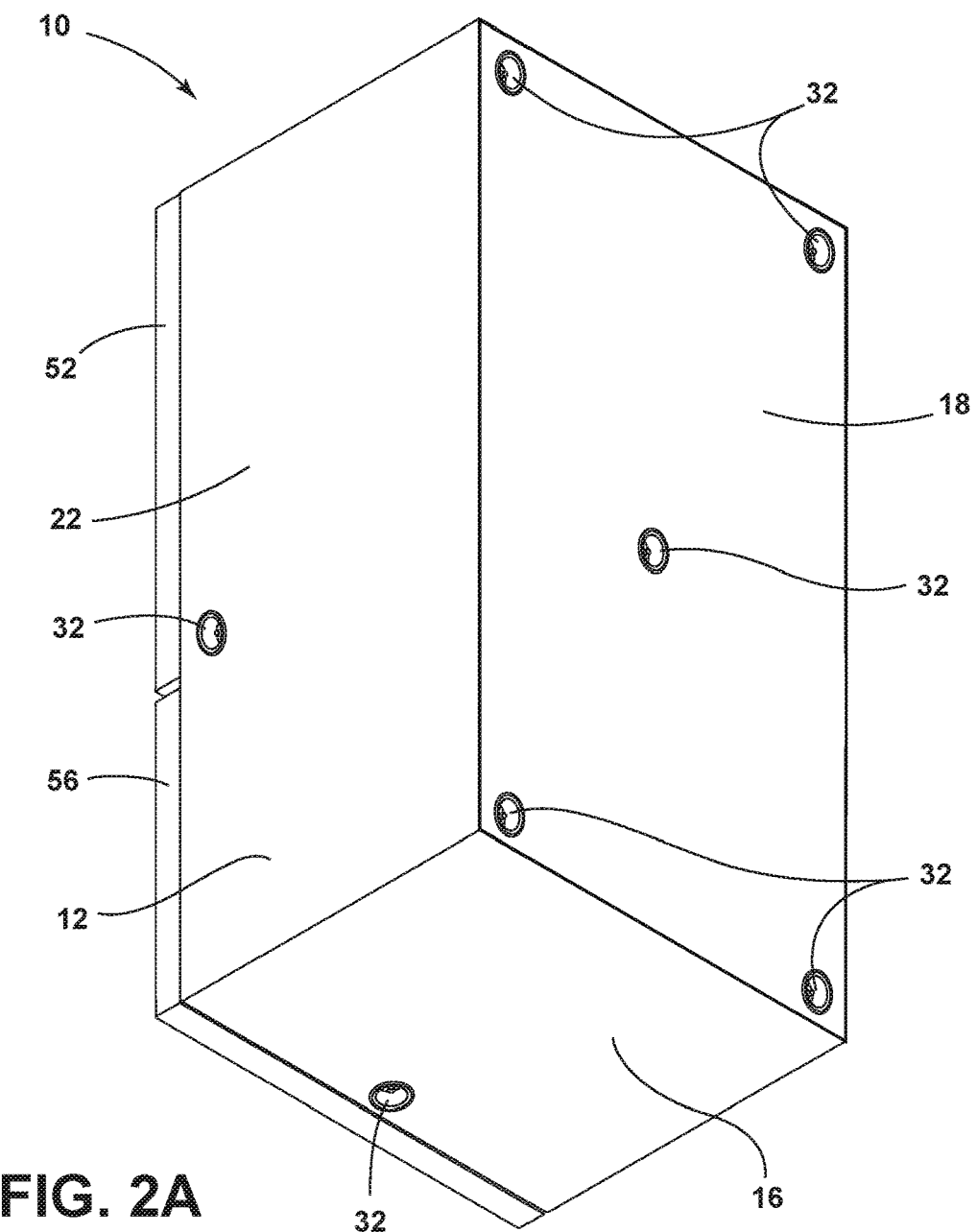
FIG. 2A is a bottom perspective view of the appliance of FIG. 2.
Figure 2B:
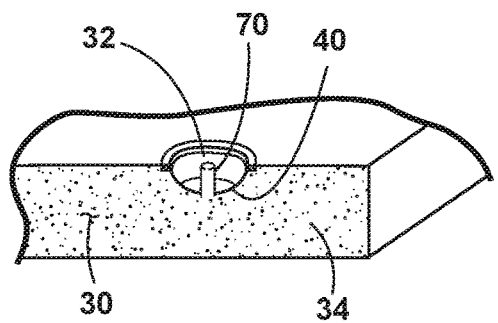
FIG. 2B is a partial perspective cross-sectional view of a vacuum port on an appliance of the present disclosure.

It will be understood that the inner liner 24 and the outer wrapper 12 are connected at the trim breaker 26 generally disposed proximate the opening of the appliance 10. The trim breaker 26 is sealed and airtight such that air can neither escape nor enter into the insulation space 30 between the outer wrapper 12 and the inner liner 24 at the trim breaker 26. In addition, it will be understood that the insulative material 34 is disposed throughout the appliance 10 in the insulation space 30. During assembly of the appliance 10, the insulative material 34 is poured, or otherwise blown into, the insulation space 30 before the insulation space 30 is sealed airtight. In addition, it will be noted that, as illustrated in FIGS. 2 and 2A, the filter media 40 is disposed between the vacuum port 32 and the insulative material 34. The filter media 40 acts to prevent insulative material 34 from being drawn through the vacuum port 32 when a negative pressure is placed on the insulation space 30. Accordingly, the insulative material 34 is maintained in the insulation space 30 between the outer wrapper 12 and the inner liner 24 as air is drawn from the insulation space 30 by an external vacuum pump. The filter media 40 may have a variety of constructions and may be constructed from sintered metal, plastic, etc. The filter media 40, or portions of the filter media 40, may also be constructed from a fiberglass based filter media. Regardless of the filter media material choice, the pores of the filter media 40, and specifically, the size of the pores, will be dictated by the size of the granules, fibers, or strands that make up the insulative material 34 disposed in the insulation space 30. The pores of the filter media 40 will be smaller than the fibers, strands, or granules of the insulative material 34. Accordingly, air can be drawn from the insulation space 30 without removing the insulative material 34 after the insulative material 34 is installed between the inner liner 24 and the outer wrapper 12.

Figure 3:
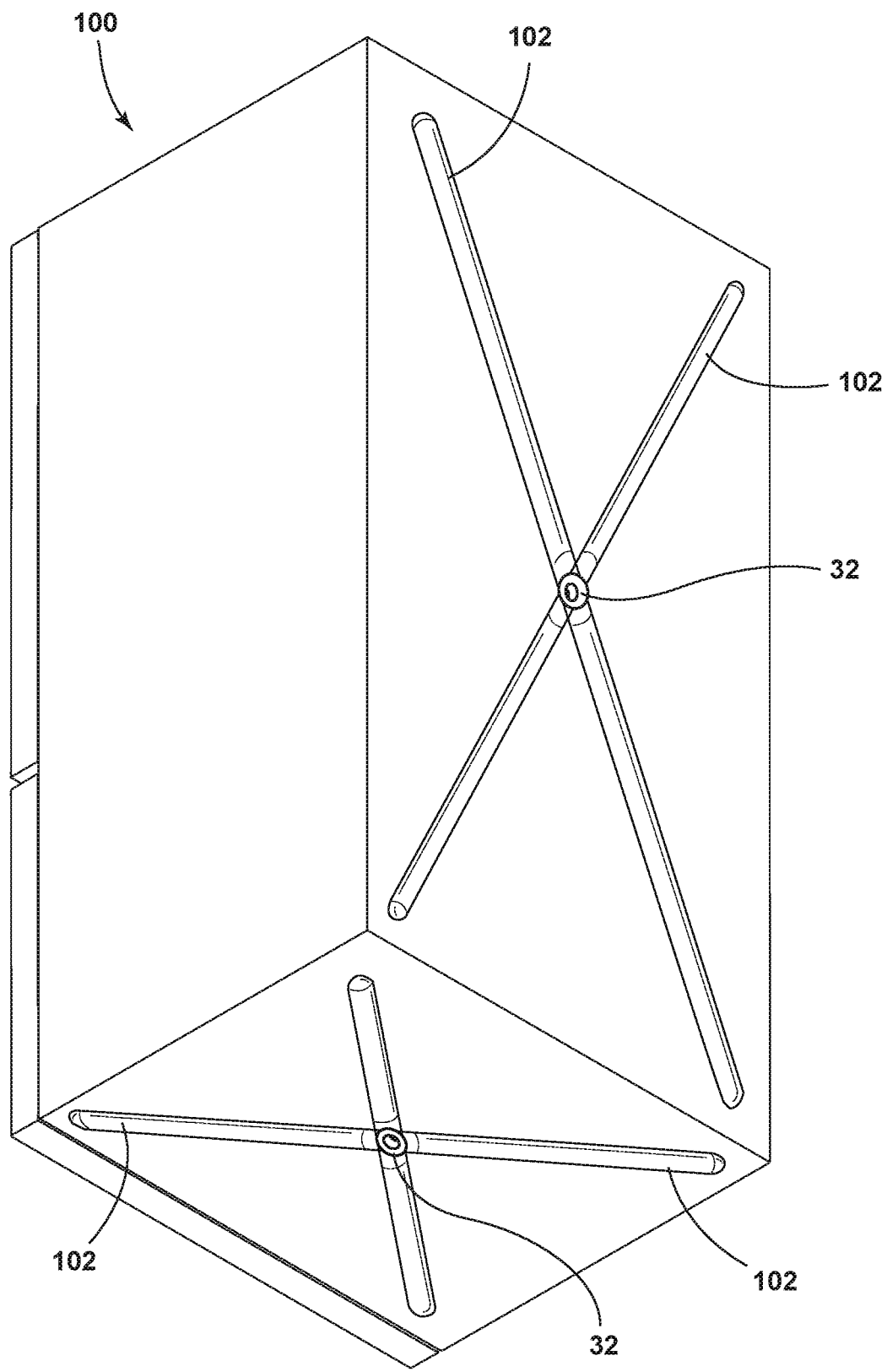
FIG. 3 is a bottom perspective view of another appliance of the present disclosure.
Figure 3A:
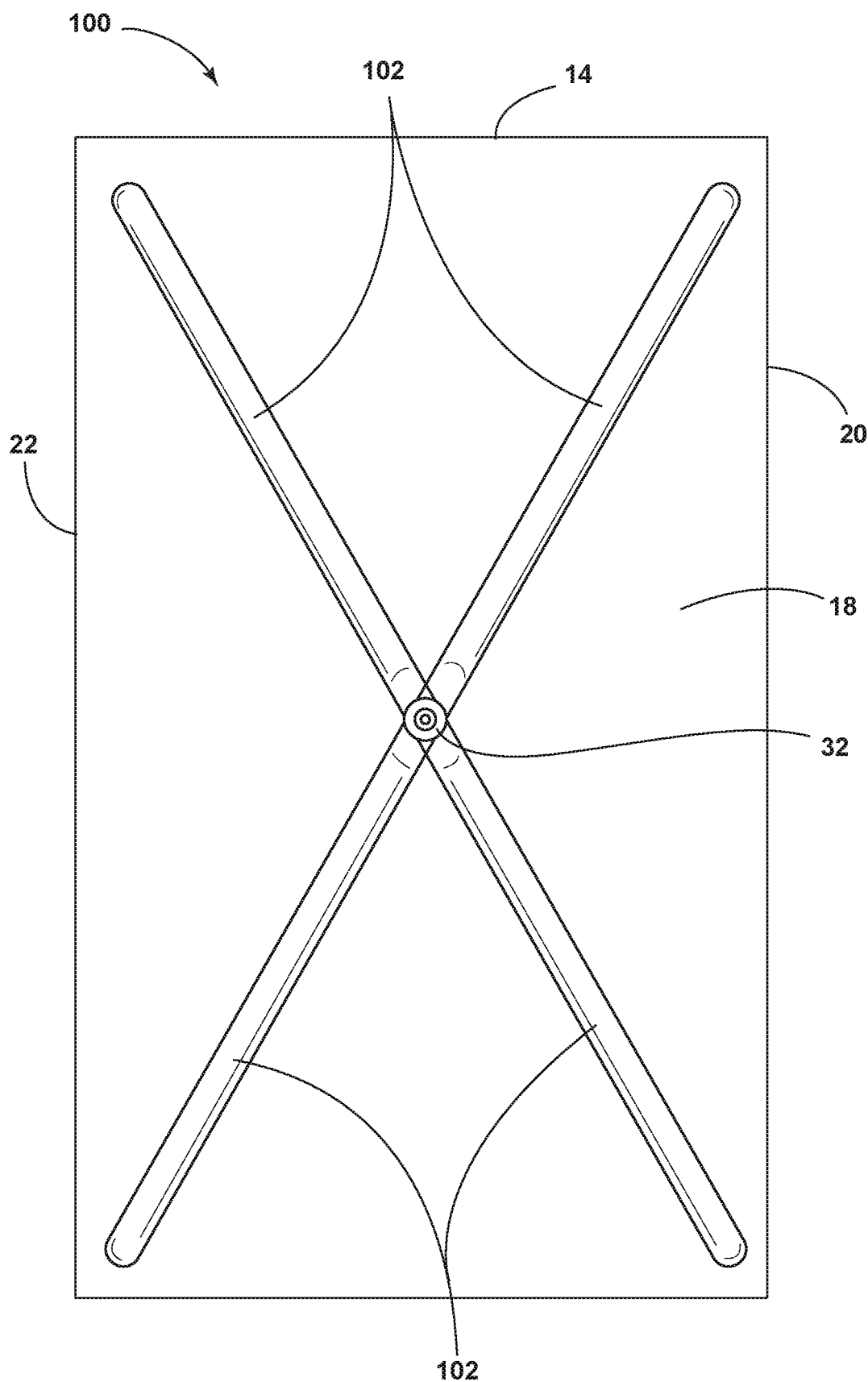
FIG. 3A is a rear elevational view of the appliance of FIG. 3.
Figure 3B:
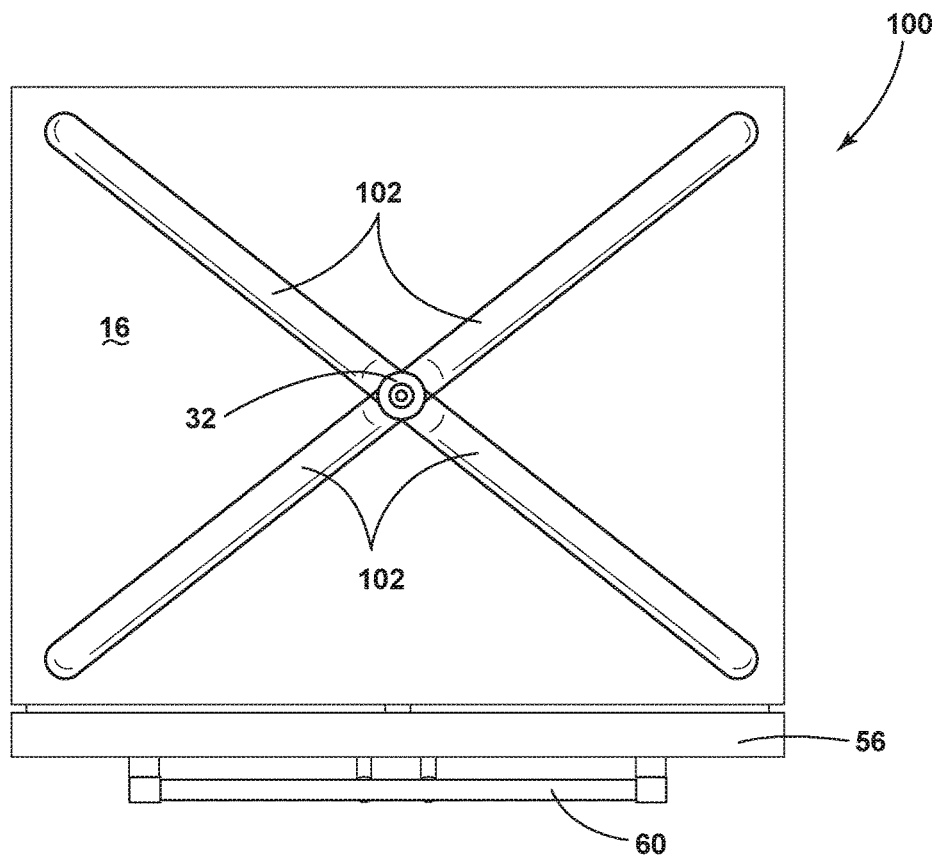
FIG. 3B is a bottom plan view of the appliance of FIG. 3.
Figure 3C:
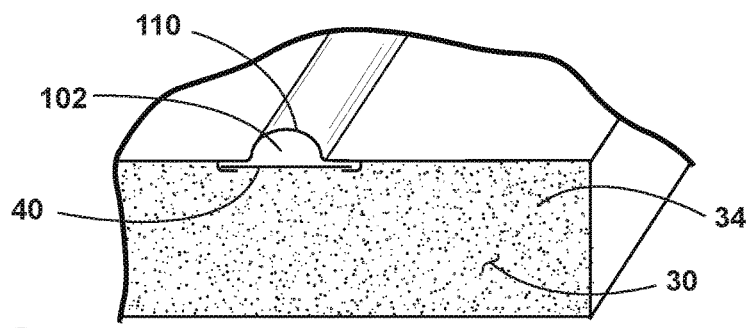
FIG. 3C is a partial perspective cross-sectional view of a channel on an appliance of the present disclosure.

With reference now to FIGS. 3-3C, the illustrated appliance 100 includes a plurality of channels 102 that are in fluid communication with each vacuum port 32. The channels 102 are disposed on each of the rear wall 18 and the bottom wall 16. The channels 102 are configured to extend to distal corners 104 of the rear wall 18 and distal corners 106 of the bottom wall 16. Accordingly, when the insulation space 30 is being vacuumed at the vacuum port 32, air is drawn through the channels 102 from the insulation space 30 and out the vacuum port 32. In this instance, the filter media 40 is elongate and disposed along each of the channels 102 to prevent the insulative material 34 from entering into the channel 102 and being withdrawn from the vacuum port 32. By increasing the overall vacuum space on the back wall and the bottom wall 16 of the appliance 10, the time to place the insulation space 30 under a suitable negative pressure is lessened.

As shown in FIG. 3C, the filter media 40 may include a relatively elongate, planar filter screen formed from a sintered metal, porous plastic, or fiberglass material that extends along the entire length of each channel 102. In this instance, the channel 102 is defined from a protruding outer casing 110 that protrudes from a planar extent of the rear wall 18 and the bottom wall 16. The casing 110 may be integrally formed with a wall of the appliance 10, or may be sealingly coupled with a wall of the appliance 10 via welding, adhesives, mechanical gaskets, etc. The casing 110 may include an arcuate cross-section, as shown, or have a square, triangular, etc. cross-section. The channel 102 draws air through the filter media 40 of the planar filter screen, while maintaining the insulative material 34 within the insulation space 30. It will be understood that the filter media 40 may be any of a number of variety of shapes and does not necessarily need to be flat.

Figure 4A:
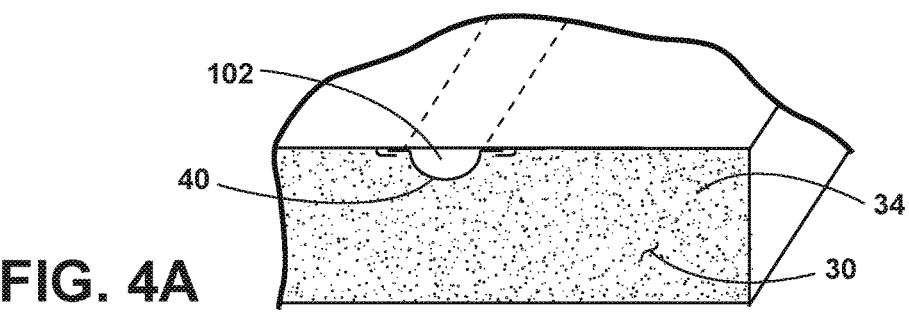
FIG. 4A is a partial perspective cross-sectional view of an insulation space of an appliance of the present disclosure with a channel extending therethrough.
Figure 4:
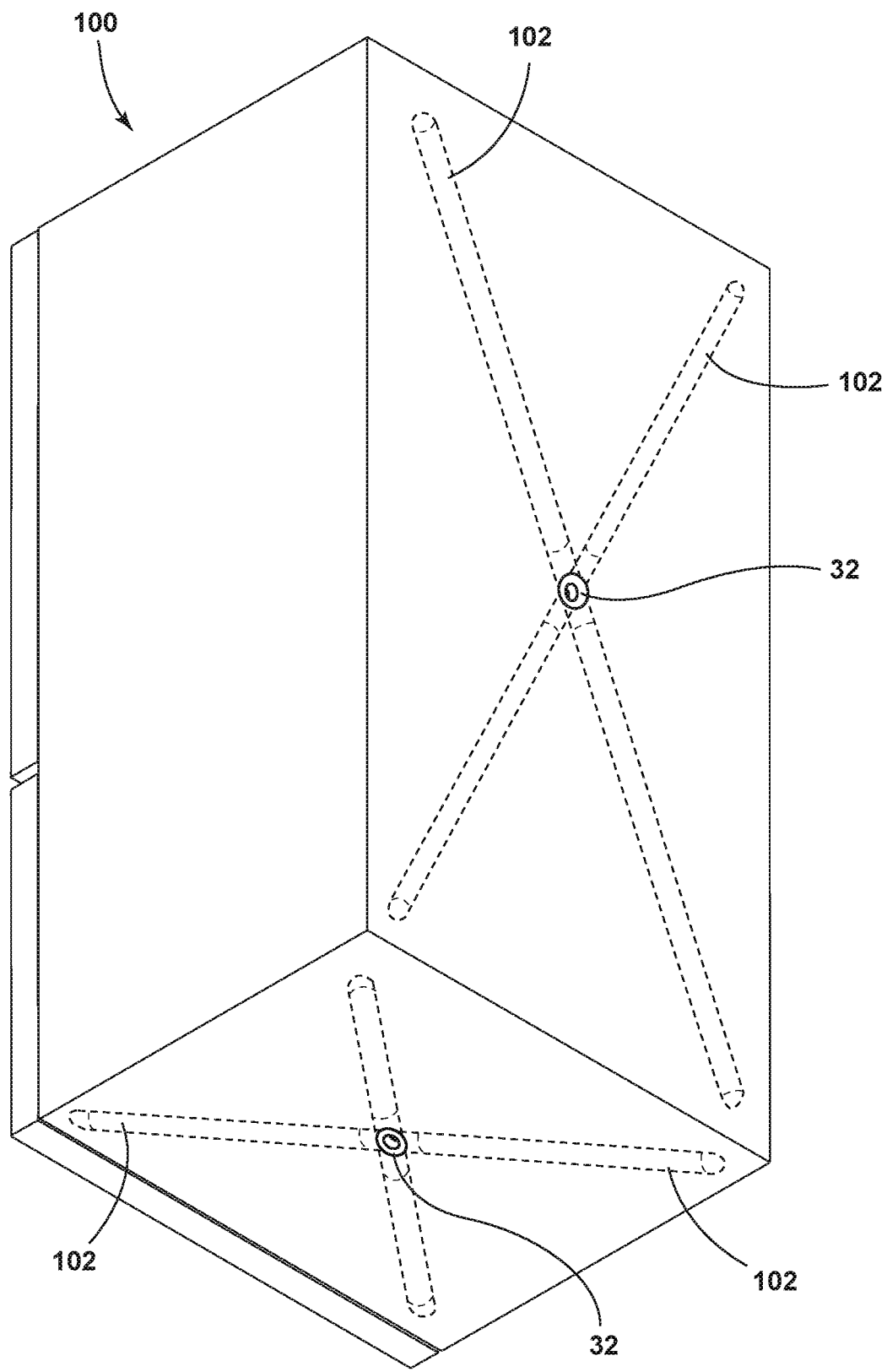
FIG. 4 is a bottom perspective view of an appliance of the present disclosure that includes vacuum channels.
Figure 5:
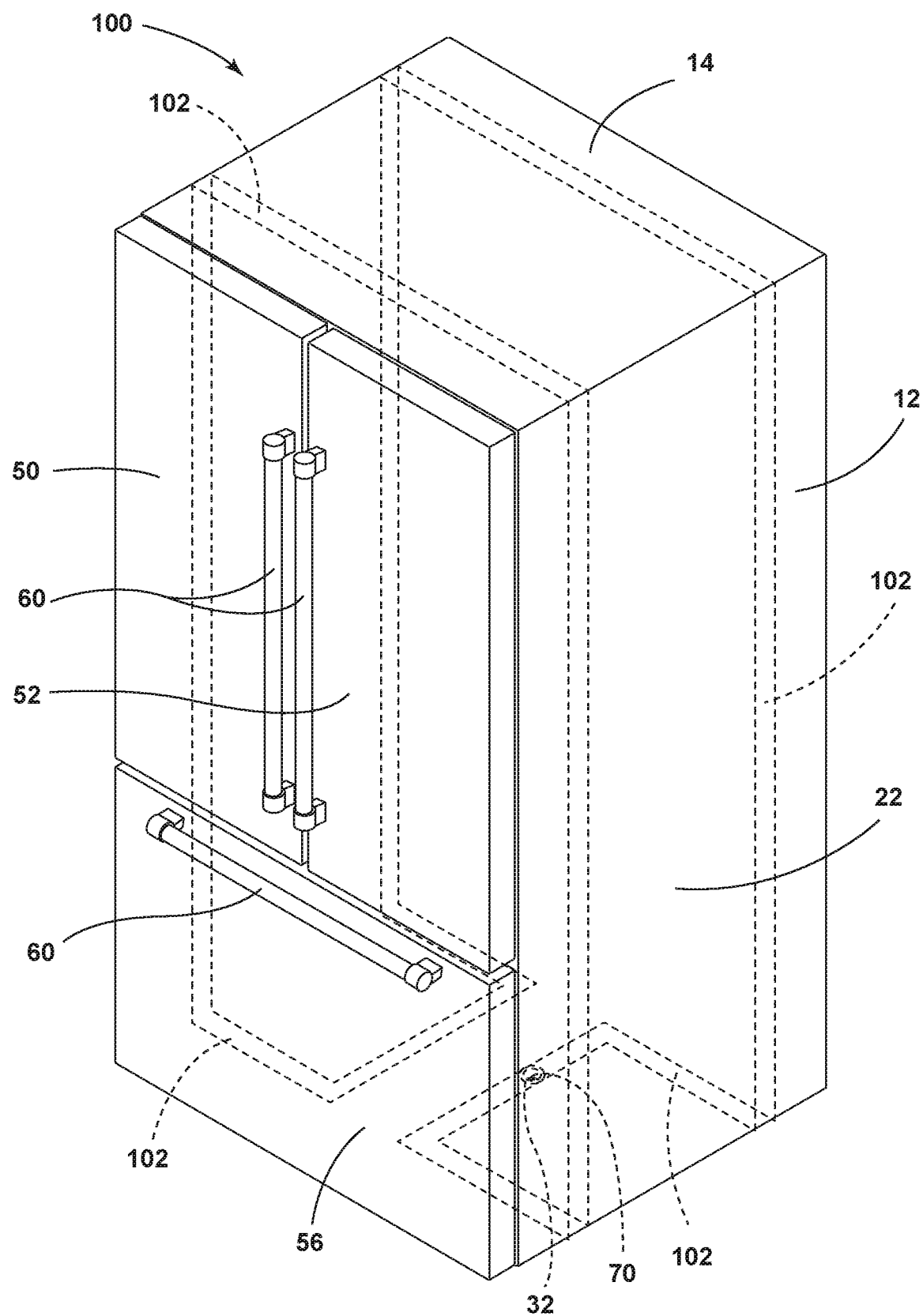
FIG. 5 is a front top perspective view of another appliance of the present disclosure.
Figure 6:
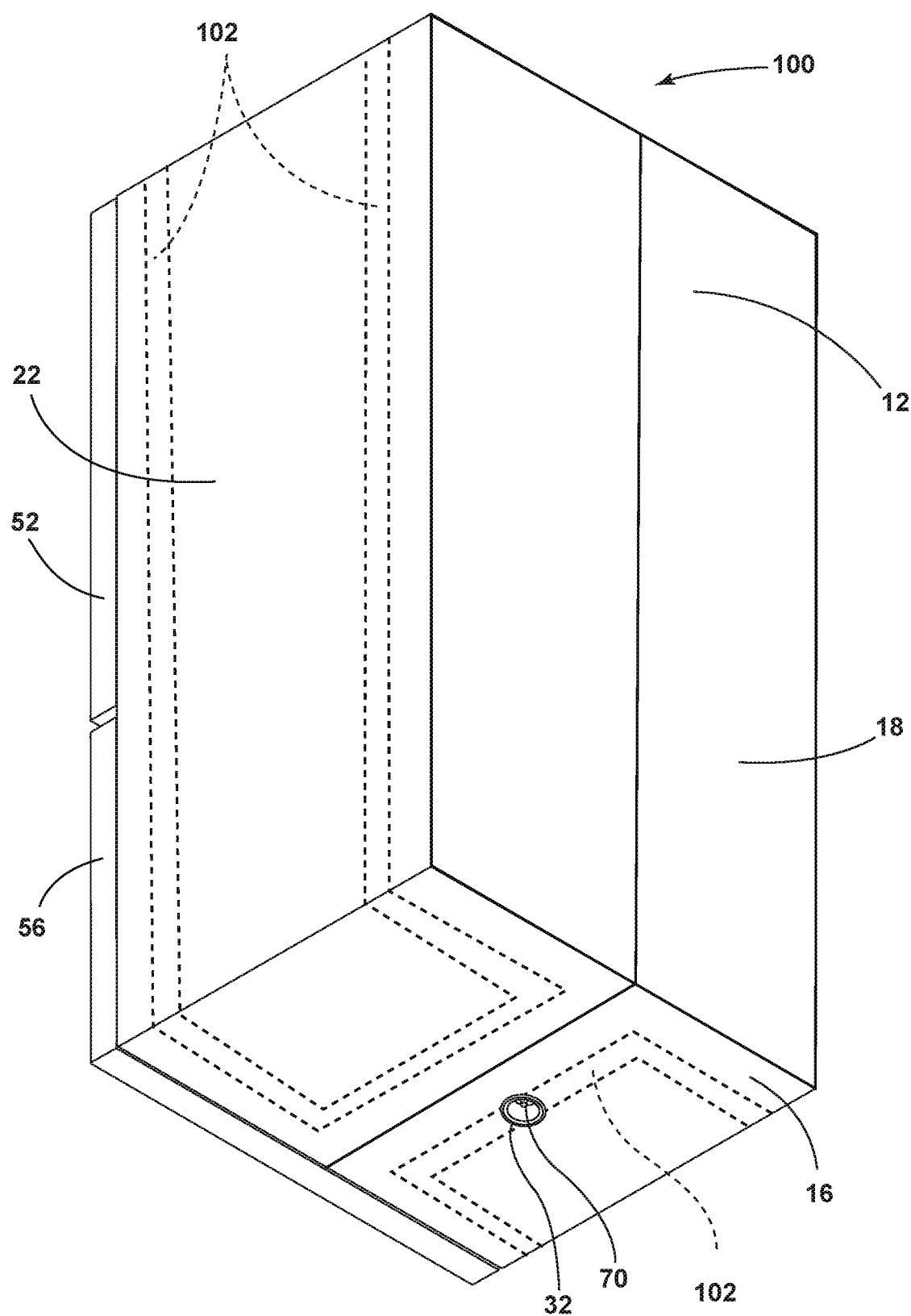
FIG. 6 is a bottom perspective view of the appliance of FIG. 5.
Figure 7:
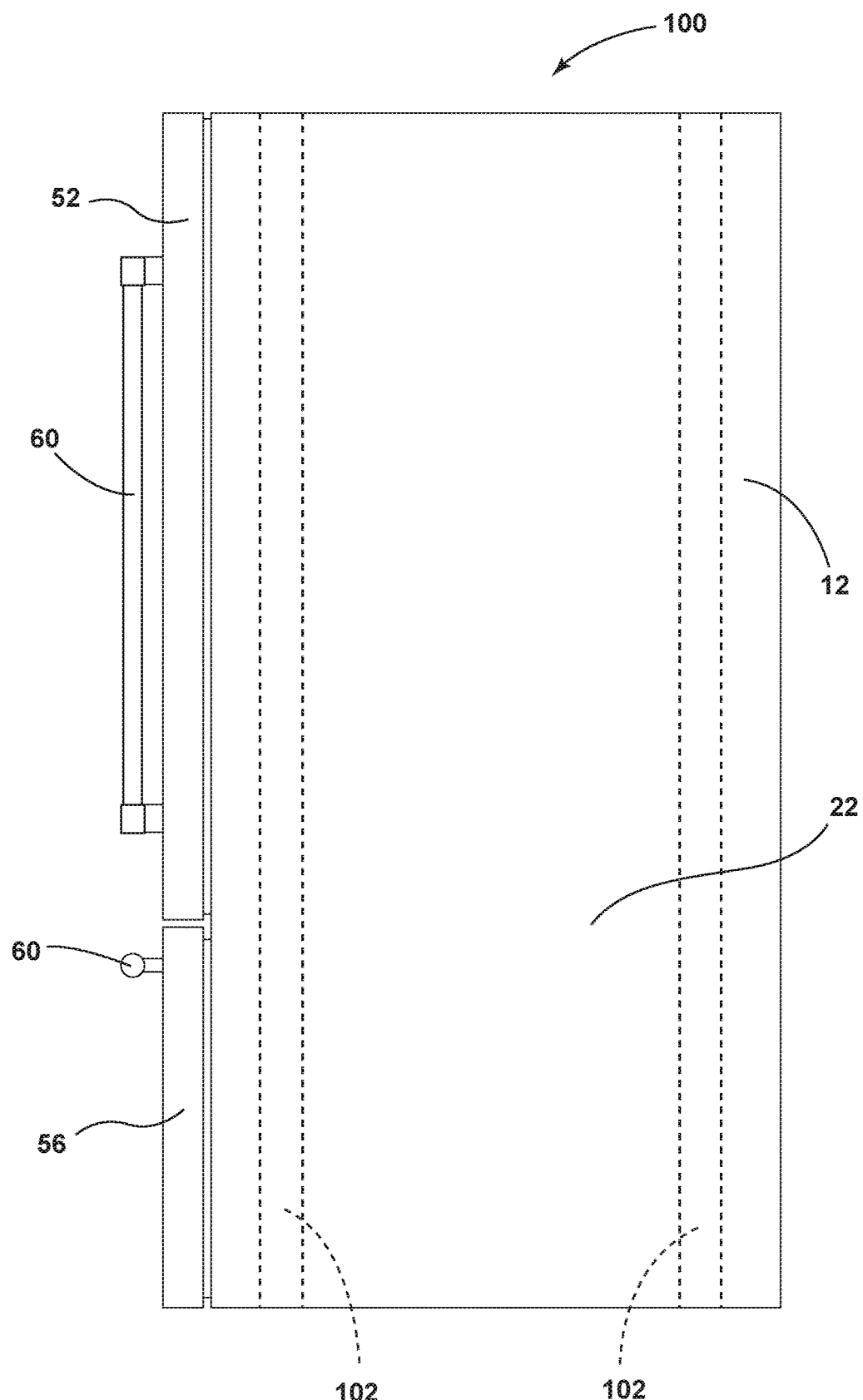
FIG. 7 is a side elevational view of the appliance of FIG. 5.
Figure 8:
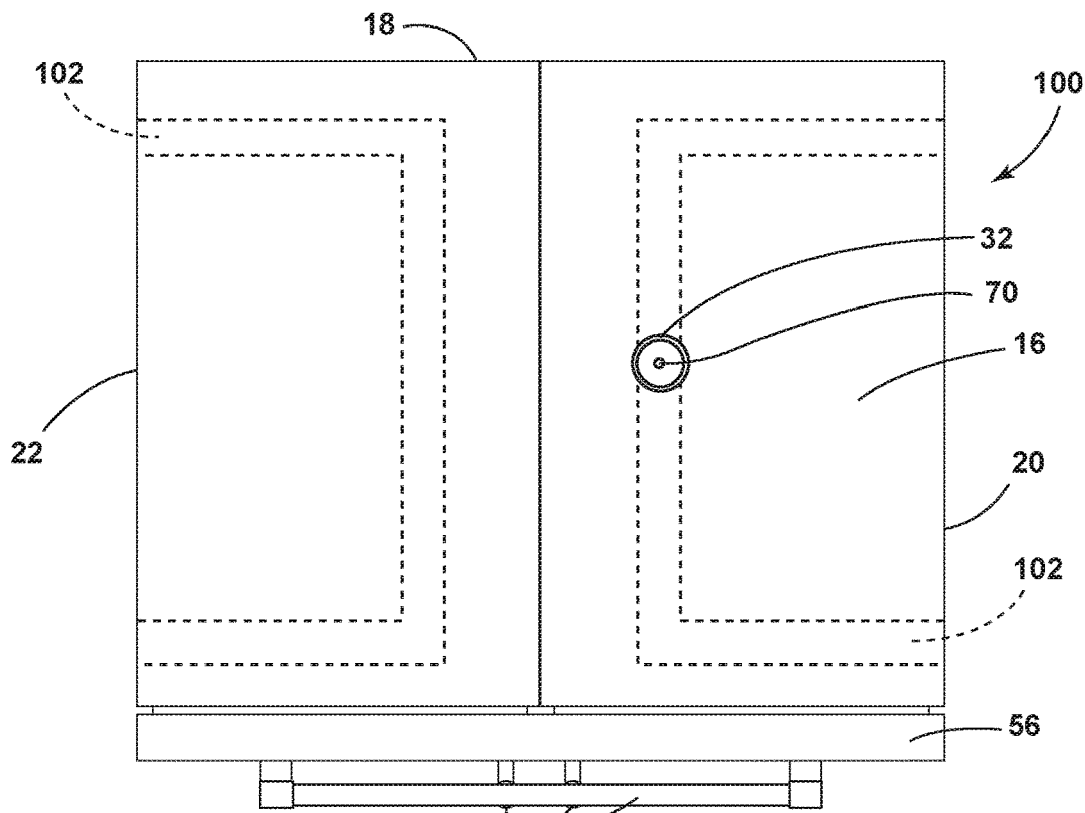
FIG. 8 is a bottom plan view of the appliance of FIG. 5.
Figure 9:
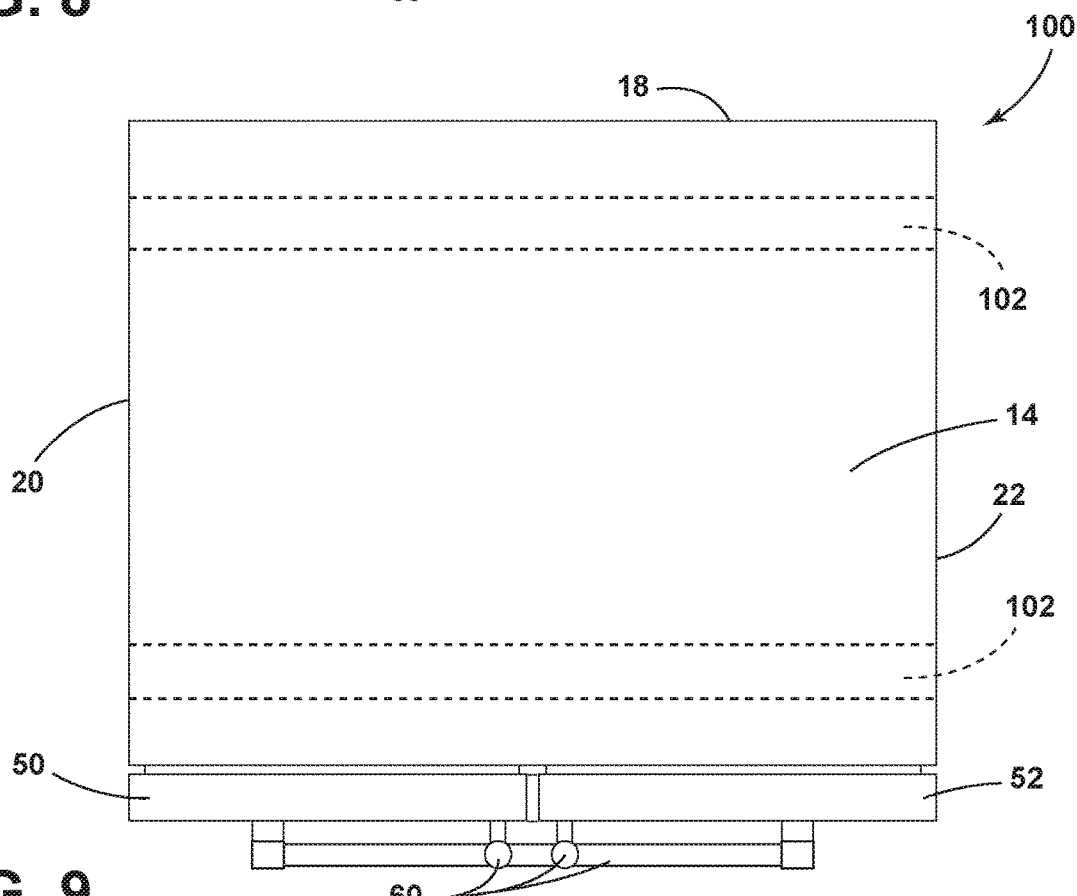
FIG. 9 is a top plan view of the appliance of FIG. 5.
Figure 10:
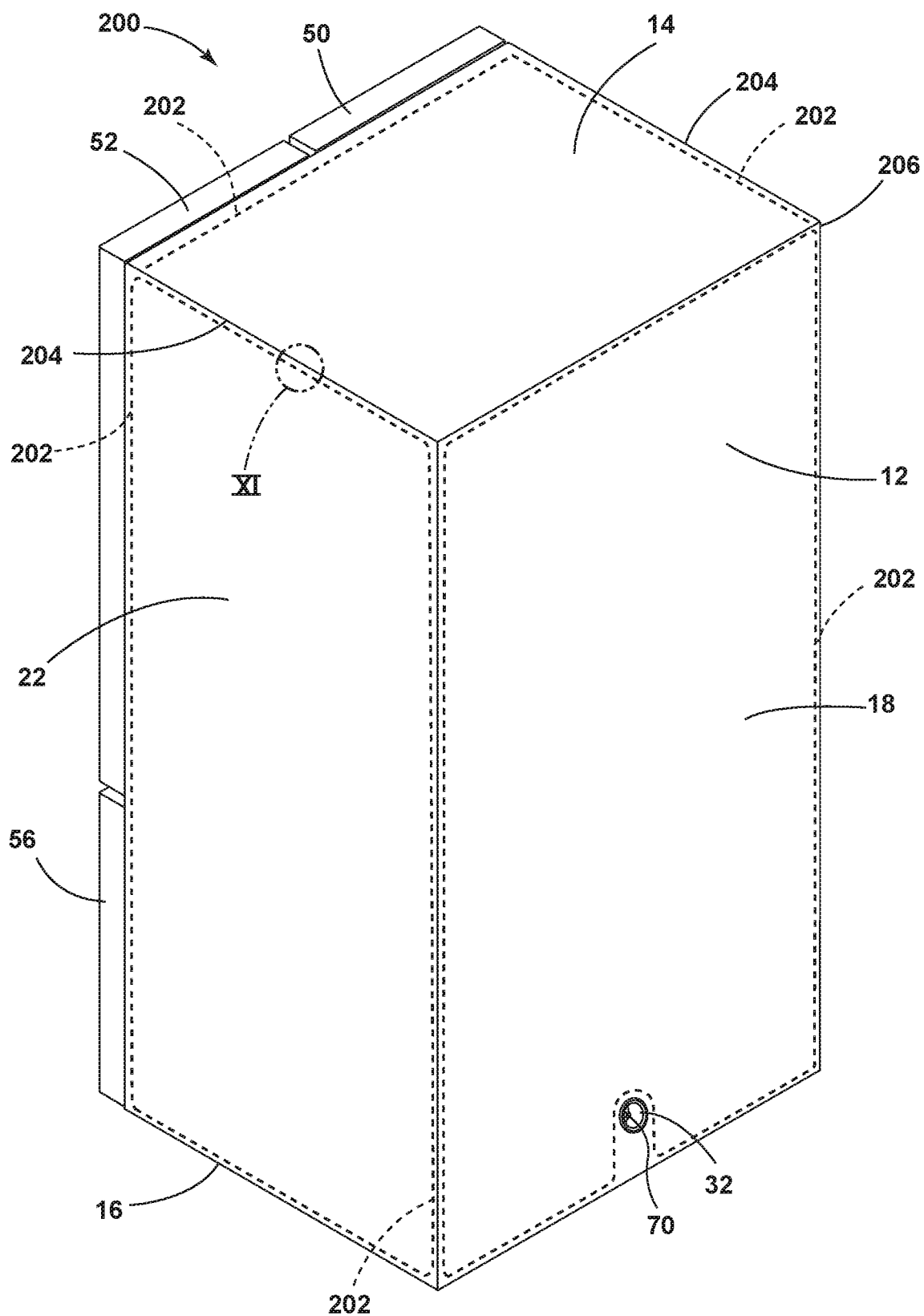
FIG. 10 is a rear top perspective view of another appliance of the present disclosure.

With reference now to FIGS. 4 and 4A, the appliance 100 is shown with the channels 102 formed within the insulation space 30. The filter media 40 for this assembly includes an elongate filter screen having a curved cross-section. In this instance, the planar extent of the rear wall 18 and/or the bottom wall 16 forms a first portion of the channel 102. The filter media 40 in the form of the elongate filter screen forms a second portion of the channel 102. Also, it will be understood that the channels 102, although shown in a linear configuration, may also have a curved shape or a circular shape that extends about the bottom wall 16 and the rear wall 18. The channels 102 could also include multiple branches that extend at any angle from the channels 102. Moreover, it will be understood that the channels may be disposed on any of the walls of the appliance 10 and are not limited to the rear wall 18 and the bottom wall 16. However, in the illustrated embodiments of FIGS. 3-4A, the channels 102 are disposed on the back wall and the bottom wall 16 as these are typically portions of the appliance 10 that are not exposed to the consumer. Accordingly, the first and second side walls 20, 22 can be exposed with no apparent additional structure that relates to the vacuuming process disposed thereon.

With reference now to FIGS. 5-9, the illustrated appliance 10 includes the channel 102 extending in a loop configuration. Specifically, the channel includes one vacuum port 32, which, in this instance is disposed on the bottom wall 16 of the appliance 10. The channel 102 extends about the bottom wall 16, the first side wall 20, the top wall 14, the second side wall 22, and back to the bottom wall 16, before returning to the second side wall 22, the top wall 14, and the first side wall 20 and back to the bottom wall 16. In this instance, negative pressure is obtained within the insulation space 30 when the vacuum port 32 is operably coupled with the external vacuum system. Air is then drawn through the channel 102, which extends through each of the four walls between the outer wrapper 12 and the inner liner 24 until a suitable negative pressure has been reached. It will be understood that the loop configuration for drawing air from the appliance 10 is not limited to the configuration shown. For example, another looped channel could extend about the back wall and could be operably coupled with the loop shown in FIGS. 5-9, or could be a separate loop with a separate vacuum port 32, which may depend on the needed speed and negative pressure that is desirable for the insulation space 30 of the appliance 10. It will be understood that the channels 102 of the appliance 10 may protrude from one or more of the walls, as shown in FIG. 3C, or may be formed within the insulative material 34 in the insulation space 30 of the appliance 10.

With reference now to FIGS. 10-15, an appliance 200 is illustrated having channels 202 that are again applied to the insulation space 30 between the inner liner 24 and the outer wrapper 12. However, in this instance, the channels 202 extend along edges 204 and vertices 206 of adjacent and joined walls of the outer wrapper 12. For example, one channel 202 is looped about a periphery of the second side wall 22, starting at the edge 204 defined by the second side wall 22 and the bottom wall 16, extending upward at the edge 204 defined by the front of the second side wall 22, the edge 204 defined between the second side wall 22 and the top wall 14, the edge 204 defined between the second side wall 22 and the rear wall 18, and back to the second side wall 22 and the bottom wall 16. This looped channel 102 is in fluid communication with a looped channel 102 extending about the periphery of the rear wall 18 and the vacuum port 32. The looped channel 102 extending about the periphery of the rear wall 18 starts at the edge 204 defined between the second side wall 22 and the rear wall 18, the edge 204 extending between the top wall 14 and the rear wall 18, the edge 204 extending between the first side wall 20 and the rear wall 18, and returning to the vacuum port 32 by way of the edge 204 extending between the bottom wall 16 and the rear wall 18.

Figures 11, 11A:
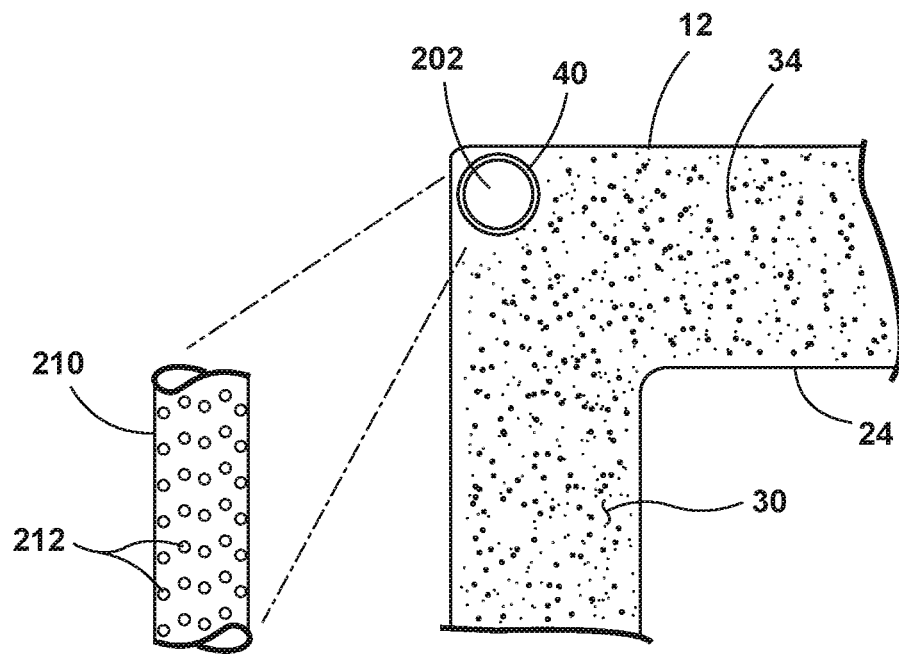
FIG. 11 is a top partial elevational cross-sectional view of a portion of the insulation space of an appliance of the present disclosure.
FIG. 11A is a partial elevational view of a filter tube for use with an appliance of the present disclosure.

As shown in FIGS. 11 and 11A, for the filter media 40, it is generally contemplated that a permeable filter tube 210 having a multitude of perforations 212 may be disposed along the edges 204 of joined walls, with the permeable filter tube 210 being in fluid communication with the vacuum port 32. The permeable filter tube 210 extends along multiple edges 204 and vertices 206 before terminating at the vacuum port 32. The permeable filter tube 210 may be coupled with an interior surface 214 of one or more of the walls 14, 16, 18, 20, 22 of the outer wrapper 12. The permeable filter tube 210 may be constructed from a sintered metal, porous plastic, or fiberglass material, for example, that allows air to be withdrawn from the insulation space 30 without removing the insulative material 34. Other air permeable structures may also be used to filter air from the insulation space 30 without removing the insulative material 34.

Figure 12:
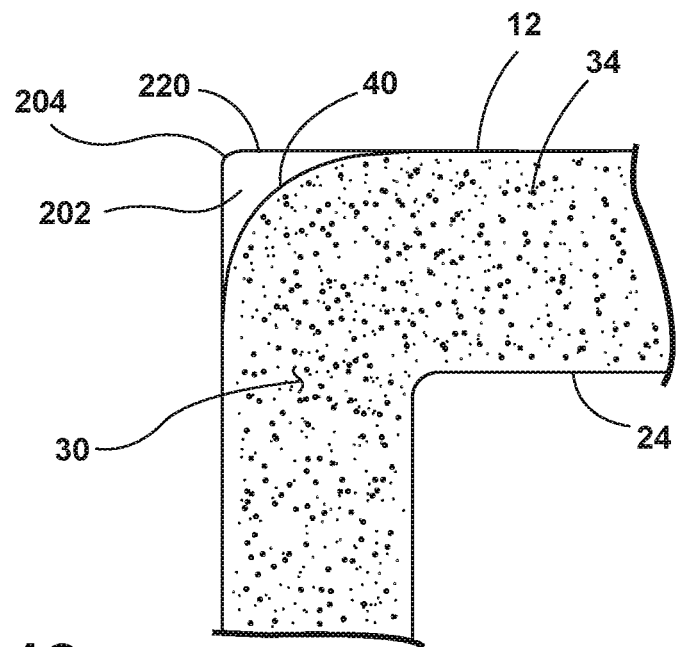
FIG. 12 is a partial elevational cross-sectional view of a portion of an appliance of the present disclosure.

With reference now to FIG. 12, it is also generally contemplated that the channel 202 may be formed in an edge space 220 defined between the edge 204 of the appliance 10 and the filter media 40 that prevents the insulative material 34 from entering into the channel 202. In this instance, the channels 202 extend along the edge spaces 220 and eventually terminate at the vacuum port 32 located at a bottom of the rear wall 18. In the illustrated of FIG. 12, the filter media 40 is curvilinear outward (convex) and prevents the insulative material 34 from entering into the channel 202. However, it will be understood that the filter media 40 may be flat, or may be concave inward toward the insulative material 34. The structure of the channels 202 may depend upon the needed construction time determined for a particular appliance.

Figure 13:
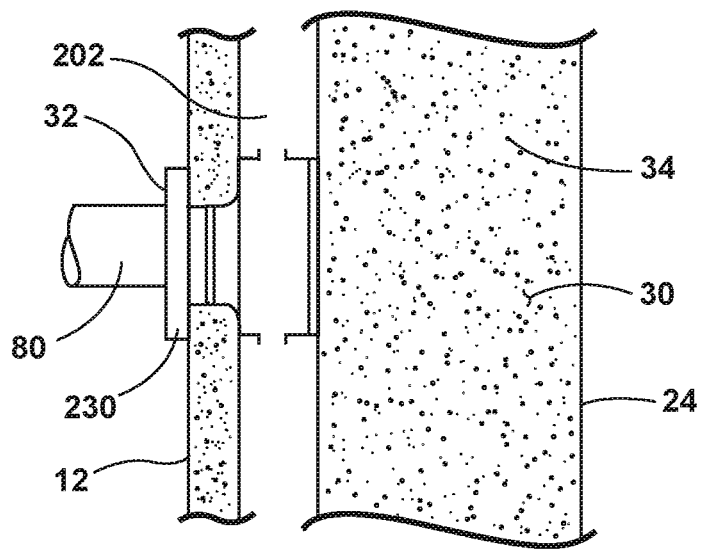
FIG. 13 is a partial side elevational view of a vacuum port of the present disclosure.
Figure 14:
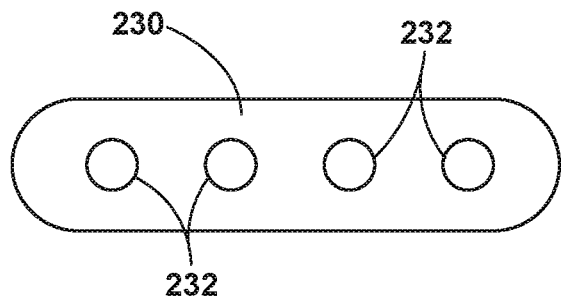
FIG. 14 is a front elevational view of a vacuum port panel of the present disclosure.
Figure 15:
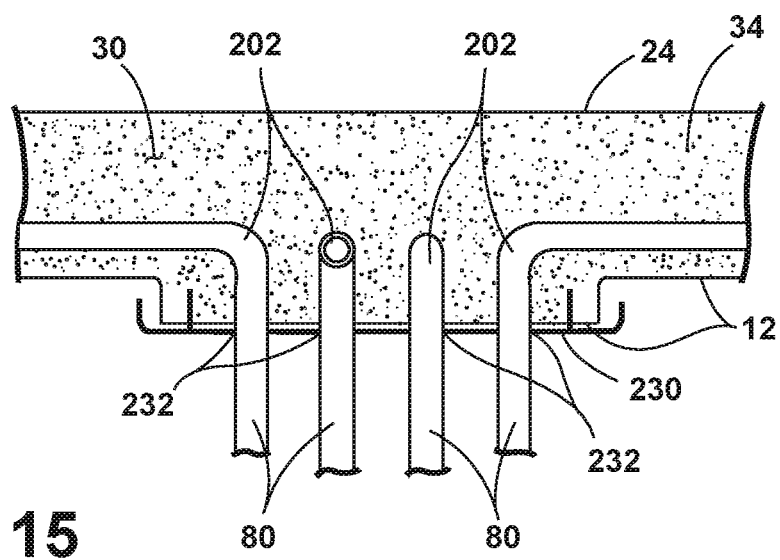
FIG. 15 is a top plan cross-sectional view of vacuum ports extending through a panel of an appliance of the present disclosure.

With reference now to FIGS. 13-15, in the illustrated embodiment, the vacuum ports 32 are in fluid communication with the channels 202 and may include a vacuum port panel 230 having apertures 232 for receiving and securing the vacuum ports 32. that places all of the vacuum ports 32 in close proximity. As shown in FIG. 13, the vacuum port 32 includes a valve that is configured to allow air to escape from the vacuum port 32, but not enter into the vacuum port 32 from the environment. As the channels 202 enter into the insulation space 30, the channels 202 extend in a variety of directions generally directed at distal vertices of the appliance 10. Consequently, a strong vacuum can be placed on the channels 202 and a negative pressure of the appliance 10, and specifically, the insulation space 30 of the appliance 10, can be maintained in a minimal amount of time. Accordingly, production, product quality, and energy efficiency in both making and using the appliance 10 can be increased.

For each of the embodiments set forth herein, the filter media 40 may include any of a variety of materials, including sintered material (metal, stainless steel, steel, alloys, aluminum, stone, ceramic, etc.), porous plastic, permeable fiberglass, etc. The filter media 40 will be understood to maintain structural integrity even under high vacuum environments with high negative pressure values. Consequently, the insulative material 34 is kept in the insulation space 30 and high thermal efficiency can be obtained.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its form, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. An appliance comprising:
   an outer wrapper including a plurality of joined walls defining a plurality of vertices and edges, including a top wall joined with a rear wall, a first side wall, and a second side wall along a first edge, a second edge, and a third edge, respectively;
   an inner liner sealed with the outer wrapper by a trim breaker to define an insulation space;
   a vacuum port disposed on an external surface of the outer wrapper;

a channel in fluid communication with the vacuum port and comprising at least a first channel portion extending along the first edge and at least one of the second and third edges;
an insulative material disposed between the outer wrapper and the inner liner; and
a filter media disposed along the channel such that air can be drawn from the insulation space past the filter media, into the channel, and through the vacuum port, and
wherein the channel is defined by a channel wall, and wherein a first portion of the channel wall is formed by the filter media and a second portion of the channel wall is formed by an adjacent portion of the outer wrapper.

2. The appliance of claim 1, wherein the filter media extends from the rear wall to the top wall.

3. The appliance of claim 1, further comprising:
a fourth edge defined by the rear wall and the first side wall; and
a fifth edge defined by the rear wall and the second side wall, and
wherein the channel further comprises a second channel portion extending along the fourth edge and a third channel portion extending along the fifth edge, and wherein the vacuum port is operably coupled with each of the second and third channel portions.

4. The appliance of claim 1, further comprising:
a panel operably coupled with one of the plurality of joined walls, the panel including at least one aperture configured to receive the vacuum port.

5. The appliance of claim 1, wherein the first channel portion extends in a loop about a periphery of the top wall along the first, second, and third edges, and wherein the channel further comprises:
a second channel portion extending in a loop about a periphery of one of the rear wall, first side wall, and second side wall, and wherein the second channel portion is in fluid communication with the first channel portion and the vacuum port.

6. The appliance of claim 1, wherein the first channel portion extends along the first edge, the second edge, and the third edge.

7. The appliance of claim 1, wherein the filter media is convex.

8. An appliance comprising:
an outer wrapper including a top wall, a first side wall, and a second side wall joined to a rear wall to define first, second, and third edges, respectively;
an inner liner sealed with the outer wrapper by a trim breaker to define an insulation space;
a vacuum port disposed on an external surface of the outer wrapper;
a first channel loop extending about a periphery of the rear wall along the first, second, and third edges and in fluid communication with the vacuum port;
an insulative material disposed between the outer wrapper and the inner liner; and
a filter media disposed along the first channel loop such that air can be drawn from the insulation space past the filter media, into the first channel loop, and through the vacuum port, and
wherein the first channel loop is defined by a channel wall, and wherein a first portion of the channel wall is formed by the filter media and a second portion of the channel wall is formed by adjacent portions of the outer wrapper defining the first, second, and third edges.

9. An appliance comprising:
an outer wrapper including a rear wall, opposing first and second side walls, a top wall, and a bottom wall;
an inner liner sealed with the outer wrapper by a trim breaker to define an insulation space;
a vacuum port disposed on an external surface of the outer wrapper;
a plurality of channels in fluid communication with the vacuum port and extending along each of a plurality of junctions formed by adjacent portions of the rear wall, the opposing first and second side walls, the top wall, and the bottom wall;
an insulative material disposed between the outer wrapper and the inner liner; and
a filter media disposed along each of the plurality of channels such that air can be drawn from the insulation space past the filter media, into the channel, and through the vacuum port, and
wherein each of the plurality of channels is defined by a channel wall, and wherein a first portion of the channel wall is formed by the filter media and a second portion of the channel wall is formed by an adjacent portion of the outer wrapper.

10. The appliance of claim 9, wherein the filter media extends between the adjacent portions of the rear wall, the opposing first and second side walls, the top wall, and the bottom wall forming the plurality of junctions.

11. The appliance of claim 1, wherein the vacuum port is disposed in one of the bottom wall and the rear wall.

12. The appliance of claim 1, further comprising:
a panel operably coupled with one of the rear wall, the opposing first and second side walls, the top wall, or the bottom wall, the panel including at least one aperture configured to receive the vacuum port.

13. The appliance of claim 9, wherein the filter media is convex.

14. The appliance of claim 8, further comprising:
a panel operably coupled with one of the plurality of joined walls, the panel including at least one aperture configured to receive the at least one vacuum port.

15. The appliance of claim 14, further comprising a second channel loop extending about a periphery of at least one of the first side wall and the second side wall and in fluid communication with the first channel loop.

16. The appliance of claim 14, further comprising:
a second channel loop extending about a periphery of the top wall and in fluid communication with the first channel loop.

17. The appliance of claim 14, further comprising:
a bottom wall joined with the rear wall to define a fourth edge, and
wherein the first channel loop extends along the fourth edge.

18. The appliance of claim 14, wherein the vacuum port is disposed in the rear wall.

19. The appliance of claim 14, wherein the filter media is convex.

20. The appliance of claim 14, further comprising:
a second channel loop extending about a periphery of the top wall and in fluid communication with the first channel loop;
a third channel loop extending about a periphery of the first side wall and in fluid communication with the first channel loop; and a fourth channel loop extending about a periphery of the second side wall and in fluid communication with the first channel loop.

\* \* \* \* \*

UNITED STATES PATENT AND TRADEMARK OFFICE
CERTIFICATE OF CORRECTION

PATENT NO. : 11,035,607 B2
APPLICATION NO. : 16/302939
DATED : June 15, 2021
INVENTOR(S) : Naik et al.

It is certified that error appears in the above-identified patent and that said Letters Patent is hereby corrected as shown below:

In the Claims

Column 10, Claim 11, Line 29, "claim 1" should be --claim 9--;

Column 10, Claim 12, Line 31, "claim 1" should be --claim 9--;

Column 10, Claim 15, Line 43, "claim 14" should be --claim 8--;

Column 10, Claim 16, Line 47, "claim 14" should be --claim 8--;

Column 10, Claim 17, Line 51, "claim 14" should be --claim 8--;

Column 10, Claim 18, Line 56, "claim 14" should be --claim 8--;

Column 10, Claim 19, Line 58, "claim 14" should be --claim 8--; and

Column 10, Claim 20, Line 60, "claim 14" should be --claim 8--.

Signed and Sealed this
Twenty-fourth Day of May, 2022

Katherine Kelly Vidal
*Director of the United States Patent and Trademark Office*